Patented Aug. 3, 1937

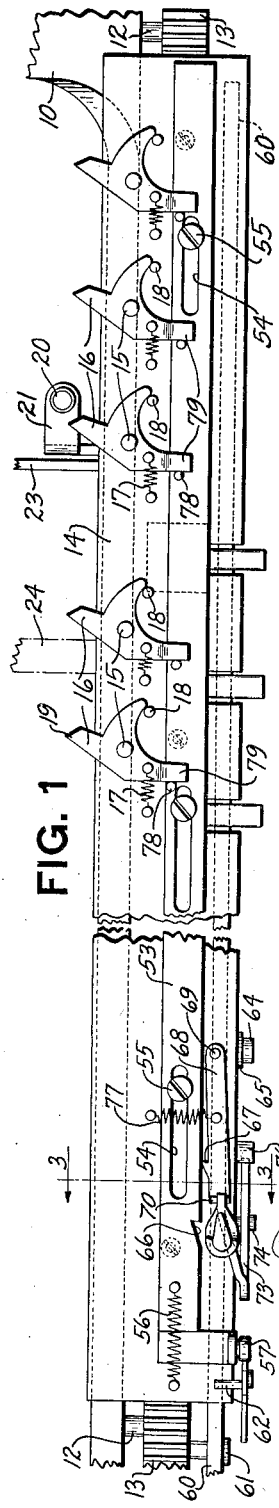
Aug. 3, 1937.  A. OTT ET AL  2,088,662
ACCOUNTING MACHINE
Filed Feb. 25, 1935  2 Sheets-Sheet 1
Inventors
Albert Ott and
Ernst Dreyer
By
Their Attorney

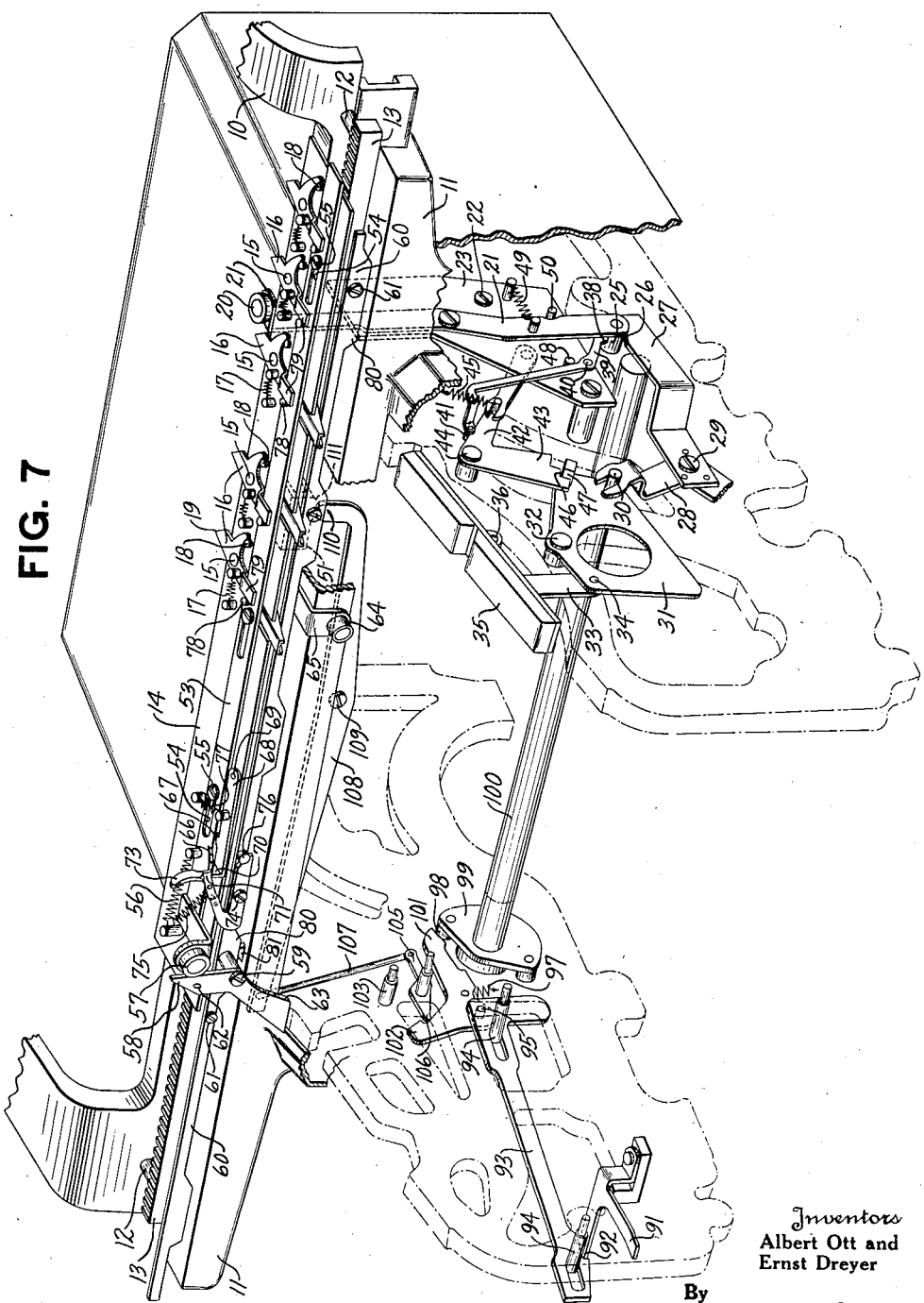

2,088,662

UNITED STATES PATENT OFFICE 2,088,662

ACCOUNTING MACHINE

Albert Ott, Zurich-Oerlikon, and Ernst Dreyer, Zurich-Hongg, Switzerland, assignors to The National Cash Register Company, Dayton, Ohio, a corporation of Maryland Application February 25, 1935, Serial No. 8,188
In France February 28, 1934

10 Claims. (Cl. 235—60)

This invention relates to improvements in the tabulating mechanism of calculating or accounting machines of the type disclosed in Letters Patent of the United States Nos. 1,197,276 and 1,197,278, issued September 5, 1916, to Halcolm Ellis, Patent No. 1,203,863, issued November 7, 1916, also to Halcolm Ellis, and U. S. Patent No. 1,819,084, issued to Emil John Ens, August 18, 1931.

Broadly it is an object of this invention to provide means under control of the traveling carriage in predetermined columnar positions thereof to automatically effect repetition of operation in order to duplicate the printing of various data in a plurality of columns of the record material.

Another object is to supply means to automatically release the machine for operation when the traveling carriage is tabulated to predetermined columnar positions.

Still another object is to provide means to disable the automatic releasing means upon return of the traveling carriage from tabulated positions.

A further object is the provision of means controlled by the traveling carriage in tabulated positions thereof to unlock the machine releasing means.

Another object is to supply means to render the disabling means for the automatic releasing means ineffective.

A further object is to provide means under control of the traveling carriage in tabulated positions thereof to disable the key releasing means in order to repeat or reprint amounts, previously set up on the keyboard, in subsequent machine operations.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Of said drawings:

Fig. 1 is a plan view of the automatic releasing mechanism.

Fig. 2 is a front elevation of the mechanism shown in Fig. 1.

Fig. 3 is a sectional view taken along line 3—3 of Fig. 1 looking in the direction of the arrows.

Fig. 4 is a detail view of the amount key releasing mechanism.

Fig. 5 is a plan view of a modified form of control lever for the automatic machine releasing means.

Fig. 6 shows in detail a part of the automatic machine releasing mechanism and the mechanism to unlock the starting bar.

Fig. 7 is a perspective view including the various parts shown in Figs. 1, 2, 4, and 6, and showing their relative location in the machine.

General description

The mechanism of the present invention is shown embodied in the well known Ellis type accounting machine, fully disclosed in the patents referred to in the beginning of this specification. However it is not the desire to restrict this invention to any particular type of machine, as it may with slight alterations and minor adjustments be adapted for use in most any type of accounting machine.

The machine of this invention has a plurality of denominational rows of amount keys which when depressed control the positioning of denominational reciprocating actuator racks, which in turn actuate the wheels of a plurality of totalizers mounted in vertical pairs at the rear of the machine. The reciprocating actuators also position type carriers arranged to make impressions on record material wound around a platen roll mounted in the frame of the traveling carriage which is supported for lateral movement on a cabinet or case that encloses the mechanism of the machine. The traveling carriage may be tabulated manually or automatically from right to left to present different columns of the record material to the type carriers. The traveling carriage when in tabulated positions is also adapted to select the different totalizers for their various functions.

The accounting machine keyboard of the instant machine also comprises a plurality of control keys which like the traveling carriage select the different totalizers for their functions and in addition control the operation of the machine.

The machine of this invention may be operated by any convenient method or means but is preferably operated by a constantly running motor secured to the base of said machine and operatively connected by a clutch mechanism to the machine drive shaft. The clutch mechanism is rendered effective by depression of the usual starting bar conveniently located on the keyboard of the accounting machine and said clutch mechanism is automatically rendered ineffective at the end of machine operation. If desirable, the accounting machine may be equipped with typewriter keys and type carriers operated thereby for the purpose of printing various data upon the record material.

DETAILED DESCRIPTION

Automatic releasing mechanism

Directing attention to Figs. 1 and 2 of the drawings, a traveling carriage 10 is supported for lateral movement on the top of a machine case 11, which is attached to the base of the machine (not shown). Secured to the front of the frame of the traveling carriage by means of studs 12 is a tabulating stop bar 13, to the top edge of which is secured a plate 14 having pivoted thereto at 15 machine releasing pawls 16. Springs 17 are tensioned to urge the pawls 19 in a clockwise direction to normally maintain tails thereof in contact with stop studs 18 fast in the plate 14.

Each of the pawls 16 has a tooth 19 adapted to cooperate with a roller 20 (see also Fig. 6) on a lever 21 pivoted at 22 to a plate 23 secured to the right frame 24 of the machine, indicated in dot and dash lines in Fig. 1. A downward extension of the lever 21 carries a roller 25 adapted to cooperate with an angular camming surface 26 on an arm 27 secured to a clutch release lever 28 pivoted at 29 to the right frame 24. A forward extension of the lever 28 is bifurcated to embrace a stud 30 in a plate 31 pivoted at 32 to the right frame. The lower end of a key stem 33 is pivoted at 34 to the plate 31 and the upper end of said key stem is adapted to cooperate with the forward portion of a double action motor bar 35 pivoted at 36 to a keyboard plate 37. The roller 25 (Fig. 6) is also adapted to cooperate with the rounded nose 38 of a downward extension of a lever 39 pivoted at 40 to the plate 23. An upward extension of the lever 39 carries a stud 41 adapted to cooperate with the upper surface 42 of a rearward extension of a locking plate 43 pivoted at 44 to the frame 24. A spring 45 urges the locking plate counter-clockwise to normally maintain a step 46 thereof in the path of a stud 47 secured in the plate 31. The spring 45 by means of the stud 41 in cooperation with the surface 42 also urges the lever 39 clockwise against a stop stud 48 in the plate 23. A spring 49 urges the lever 21 counter-clockwise into contact with a stop stud 50 secured in the plate 23. A plurality of tabulating stops 51 (Fig. 2) adjustably located on the stop bar 13 in cooperation with a tabulating stop 52 permits the traveling carriage to tabulate from right to left to present different columns or sections of the record material to the accounting machine and typewriter type carriers.

By comparing Figs. 1 and 2 it will be seen that the columnar tabulating stops 51 are located with relation to the tabulating stop bar 52 and the pawls 16 so that the teeth 19 of said pawls engage the roller 20 and impart clockwise movement to the lever 21, as viewed in Fig. 6. Clockwise movement of the lever 21 causes the roller 25 in cooperation with the rounded nose 38 to rock the lever 39 counter-clockwise, which by means of the stud 41 rocks the locking plate 43 clockwise against the tension of the spring 45 to move the step 46 out of the path of the stud 47 to permit releasing movement of the plate 31 and the lever 28. Just after the locking plate 43 has been moved to ineffective position the roller 25 in cooperation with the angular surface 26 of the arm 27 rocks the lever 28 clockwise to release the machine for operation in the well known manner as fully shown in the United States Patent to Bernau, No. 1,601,102, September 28, 1926.

When the traveling carriage is returned from left to right the pawls 16 by-pass the roller 20 without imparting any movement to the lever 21.

*Means to disable the automatic releasing means*

Mechanism is provided to render the machine releasing pawls 16 ineffective upon return of the traveling carriage to starting position. This mechanism comprises a slide 53 mounted for sliding movement on the plate 14 by means of horizontal slots 54 in said slide in cooperation with studs 55 secured in said plate 14. A spring 56 is tensioned to urge the slide 53 toward the left to cause a roller 57 attached to an upward extension of said slide 53 to contact with the upper end of a lever 58 pivoted at 59 to a plate 60 secured by means of studs 61 to the tabulating stop bar 13. A stop stud 62 in the lever 58 in cooperation with the top surface of the plate 14 limits the counter-clockwise movement of said lever 58 and the lefthand travel of the slide 53 under the influence of the spring 56. The lever 58 has an arcuate surface 63 which cooperates with a roller 64 carried by a bracket 65 secured to the machine case 11.

The slide 53 (Figs. 1, 2, and 3), has near its left end a notch 66 arranged to be engaged by a tooth 67 on a retaining pawl 68 pivoted at 69 to the plate 14. The pawl 68 has an upward extension with an angular surface 70 adapted to cooperate with a nose 71 of a lever 73 pivoted at 74 to the plate 60. A spring 75 is tensioned to urge the lever 73 in a counter-clockwise direction to normally maintain an angular surface on a righthand extension thereof against a stop stud 76 in the plate 60.

When the traveling carriage 10 (Figs. 1 and 2) is being returned from left to right near the end of the return movement the arcuate surface 63 of the lever 58 engages the roller 64 to rock said lever 58 clockwise, thereby causing the upward extension thereof, in cooperation with the roller 57 to move the slide 53 toward the right against the tension of the spring 56. When the notch 66 in said slide 53 is opposite the tooth 67 in the pawl 68 a spring 77 urges said pawl clockwise to cause said tooth to engage the notch 66, to restrain lefthand movement of said slide 53 under influence of the spring 56. This righthand movement of the slide 53 causes studs 78 carried thereby in cooperation with downward extensions 79 of the pawls 16 to rock said pawls counter-clockwise until the teeth 19 thereof are out of the path of the roller 20 in the lever 21, thus rendering the automatic releasing mechanism ineffective as the carriage nears the end of its return.

When it is desired to render the automatic releasing mechanism effective, after moving the carriage out of its right most position, the manipulation of the lever 73 toward the right or clockwise by means of a convenient fingerpiece formed by an upward extension thereof will cause the nose 71 in cooperation with the angular surface 70 (Fig. 3) to rock the pawl 68 counter-clockwise to release the slide 53 to the action of the spring 56 which returns the slide 53 toward the left to the position here shown. This allows the springs 17 to return the pawls 16 to their effective positions. The lever 73 may also be used to manually return the carriage toward the right to starting position. Downwardly directed camming projections 80 on the plate 60 in cooperation with plungers 81 select particular totalizers for sub-total taking or total taking operations when the traveling carriage is tabulated to predetermined columnar positions.

A modification of retaining mechanism for the slide 53 is illustrated in Fig. 5 and will now be described. In the modification the slide 53 has a lug 82 adapted to cooperate with a stud 83 in a right angled extension of an arm 84 secured to the lever 73. A spring 85, one end of which is connected to the arm 84, urges the lever 73 counter-clockwise or toward the left to normally maintain the stud 83 in the path of the lug 82. When the slide 53 is moved toward the right by mechanism shown in Fig. 2 and explained above, the stud 83 rides over an angular surface 86 of the lug 82 and under action of the spring 85 drops in the path of said lug 82 to retain the slide 53 in its righthand position. The slide 53 may be released by manipulating the lever 73 clockwise or toward the right to rock the stud 83 out of the path of the lug 82.

*Mechanism to prevent automatic release of the amount keys in repeat operations*

In the machine of the present invention the amount keys are normally automatically released during each machine operation. Mechanism has been devised to disable the automatic key releasing mechanism in predetermined columnar positions of the traveling carriage. This mechanism, in cooperation with the automatic releasing mechanism previously described herein makes it possible to repeat the printing of amounts in different columns of the record material. This mechanism is illustrated in Figs. 2 and 4 and will now be described.

Each row of amount keys 86 has a detent 87 hinged near its top edge, the lower edge of which is urged rearwardly as shown in Fig. 4 into communication with the hooked lower ends 88 of the stems of the keys 86. The righthand edge of the detent 87 fits in a notch in a release bar 89 supported for sliding movement in the keyboard framework. The forward edge of the bar 89 has a stud 90 adapted to cooperate with one arm of a bell crank 91 pivoted at 72 to an extension of the left machine frame (not shown). A forwardly disposed arm 92 of the bell crank 91 extends within a notch in a release slide 93, slidably supported by means of slots therein in cooperation with studs 94 in the left machine frame. Pivoted at 95 to the slide 93 is a release lever 96 the lefthand hook-shaped extension of which is urged by a spring 97 into cooperation with a stud 98 in a segment 99 secured to a main machine drive shaft 100 journaled in the right and left frames of the machine.

Each time the machine operates the shaft 100 and the segment 99 oscillate first in a clockwise direction and then counter-clockwise to normal position. As the stud 98 moves beyond the hook 101 during initial movement of the segment 99 the spring 97 urges the lever 96 counter-clockwise to move said hook in the path of the stud 98. Return movement of the segment 99 causes the stud 98 to engage the hook 101, and moves the lever 96 and the slide 93 toward the left as here viewed. Lefthand movement of the slide 93 causes the bell crank 91 to shift the release bar 89 forwardly to rock the lower edge of the detent 87 also forwardly to release the depressed amount keys. After the amount keys 86 are released and when the segment 99 nears the end of its return movement counter-clockwise an upward extension 102 of the lever 96 engages a stationary stud 103 to disengage the hook 101 of said lever from the stud 98. The detents 87 being under spring tension, and through the connections as explained above, restore the slide 93 and the lever 96 to normal positions as here shown.

Pivoted on a fixed stud 104 is a lever 105, a nose 106 of which is adapted to cooperate with the edge of the extension 102 of the lever 96. The lever 105 has a lefthand extension connected by a rod 107 to a hanging bar lever 108 (Fig. 2) pivoted at 109 to a cross frame on the machine (not shown). The lever 108 has an upward extension 110 adapted to cooperate with camming lugs 111 on the stops 51.

It is obvious that the stops 51 may be located in desired columnar positions along the tabulating stop bar 13. When the traveling carriage is tabulated to predetermined columnar positions the lug 111 engages the extension 110 to rock the lever 108 clockwise, which movement by means of the rod 107 is transmitted to the lever 105 and moves said lever to the position shown in dot and dash lines in Fig. 4.

The mechanism, described above, for controlling the automatic key release is primarily intended to work in conjunction with the automatic carriage tabulating mechanism but if desired it may be used in connection with the manual tabulating mechanism. The above mechanism works slightly differently in the two methods of tabulation and this difference will now be explained.

In the present machine, automatic tabulation of the carriage takes place near the end of the cycle of operation and before the segment 99 has rocked counter-clockwise far enough for the stud 98 to engage the hook 101. By the time the stud 98 has moved to a position where it would normally engage the hook 101, the carriage will have been moved to its new position and the tappet on the carriage will have operated the lever 105 and moved the hook 101 out of the path of stud 98, so that the key releasing mechanism will not be operated.

In manual tabulating operations, the carriage is moved while segment 99 is at rest. At this time the hook 101 is not in the path of the stud 98 and when the carriage is moved to its new position the tappet on the carriage will operate the lever 105 to move the hook 101 to its ineffective position before the segment 99 starts its operation.

Thus it may be seen that in operations involving automatic carriage tabulation, the hook 101, which may have moved into the path of the stud 98 during the machine operation, may be moved out of the path of stud 98 before the segment 99 and stud 98 have moved to a position where the hook 101 would be operated, to release the keys. In operations involving manual carriage tabulation, on the other hand, the hook 101 has been moved to ineffective position before the stud 98 is operated and consequently is not in the path of the stud during any part of the machine operation.

Thus, it can be seen that the stops 51 (Figs. 1 and 2) in cooperation with the pawls 16 control the machine to automatically repeat print or duplicate data in succeeding automatic operations of the machine.

It is thought that the foregoing specification will impart a clear understanding of the mode of operation of a machine embodying the mechanism of the present invention and for this reason no specific system of operation has been included herein. Obviously a machine of this character is very flexible and is adaptable for use in any line of business where it is desired to make duplicate entries in different columns of record material. For example: Banks may use such a machine for balancing depositors' accounts, or public utility companies may use such a machine for preparing statements of subscribers' accounts. Another suggested use is the printing of post office money orders and obviously there are numerous other uses for a machine of this character.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In an accounting machine having a traveling carriage, the combination of means to release the machine for operation; means to lock the releasing means; members on the traveling carriage located in predetermined columnar positions thereof; and means whereby the members move the locking means to ineffective position and operate the releasing means.

2. In a calculating machine having a traveling carriage, the combination of means to release the machine for operation; members on the traveling carriage; means cooperating with the members when the traveling carriage is tabulated to operate the releasing means; means effective upon return of the traveling carriage from any tabulated position to render the members ineffective; and means cooperating with a part of the rendering means to restore the members to effective positions.

3. In a calculating machine having a traveling carriage, the combination of means to release the machine for operation; members on the traveling carriage located in predetermined columnar positions thereof; means cooperating with the members when the traveling carriage is tabulated to operate the releasing means; an element on the traveling carriage shiftable relatively thereto to render the members ineffective; and means effective during return of the traveling carriage from any tabulated position to shift the element to render the members ineffective.

4. In a machine of the class described having a traveling carriage, the combination of means to release the machine for operation; means to lock the releasing means in ineffective position; an element cooperating with the releasing means and the locking means; members on the traveling carriage located in relation to predetermined columnar positions thereof, adapted to move the element when the traveling carriage is tabulated to cause said element to displace the locking means and operate the releasing means; a slide on the traveling carriage movable relatively thereto to render the members ineffective; and means effective during return of the traveling carriage to a predetermined position from any tabulated position to move the slide relative to the carriage.

5. In a calculating machine having a traveling carriage, the combination of means to release the machine for operation; means to operate the releasing means; means on the traveling carriage located in relation to columnar positions thereof to displace the operating means; means on the traveling carriage and shiftable thereon to move the displacing means to ineffective position; means effective upon return of the traveling carriage from any tabulated position to operate the shiftable means; means cooperating with the shiftable means when shifted for retaining the displacing means in ineffective position; and manipulative means to render the retaining means ineffective.

6. In an accounting machine having a traveling carriage, the combination of means to release the machine for operation; members on the carriage located in relation to predetermined columnar positions thereof; means displaced by the members, when the carriage is tabulated, to operate the releasing means; means on the traveling carriage and movable relatively thereto to render the members ineffective; means effective during return of the traveling carriage from tabulated position to move the means relative to the carriage; and manipulative means to restore the means on the carriage to render the members effective.

7. In a machine of the class described having a traveling carriage, the combination of means to release the machine for operation; members on the carriage located in relation to predetermined columnar positions thereof; means displaced by the members when the carriage is tabulated to operate the releasing means; means on the carriage movable relatively thereto from a normal position to render the members ineffective; means effective upon return of the carriage from tabulated position to operate the relatively movable means; and means cooperating with the relatively movable means to retain the members in ineffective positions, said retaining means also adapted to be manipulated to restore the relatively movable means to normal and the members to effective positions.

8. In a machine of the class described having a traveling carriage, the combination of means to release the machine for operation; means to lock the releasing means in ineffective position; a plurality of members located in predetermined columnar positions on the traveling carriage; an element operated by the members upon tabulation of the carriage to render the locking means ineffective and to operate the releasing means; a slide on the traveling carriage movable relatively thereto to move the members to ineffective positions; means effective during the return of the carriage from tabulated position to operate the slide; means cooperating with the slide to retain the members in ineffective positions; and manipulative means to render the retaining means ineffective.

9. In a machine of the class described having a traveling carriage, the combination of means to release the machine for operation; members on the traveling carriage; means operable by said members, when the carriage is moved in tabulating direction, to operate said releasing means; disabling means for said members, said disabling means being mounted on the carriage; and means for operating the disabling means during the return of the carriage to a predetermined position from a tabulated position whereby the members are rendered ineffective to operate the releasing means.

10. In a machine of the class described having a traveling carriage, the combination of normally ineffective control means mounted thereon; means for rendering the control means effective, said controlling means remaining effective throughout tabulating movements of said carriage; and means for restoring the control means to ineffective condition, said restoring means being operable during the return of the carriage from any tabulated position.

ALBERT OTT.
ERNST DREYER.